United States Patent

[11] 3,585,859

[72] Inventors Richard V. De Leo
Hopkins;
Floyd W. Hagen, Minneapolis, both of, Minn.
[21] Appl. No. 827,504
[22] Filed May 26, 1969
[45] Patented June 22, 1971
[73] Assignee Rosemount Engineering Company
Minneapolis, Minn.

[54] AERODYNAMICALLY COMPENSATED STATIC PRESSURE TUBE
16 Claims, 7 Drawing Figs.

[52] U.S. Cl. .................................................. 73/388, 73/212
[51] Int. Cl. .................................................. G01l 7/00

[50] Field of Search .......................................... 73/388, 212, 182, 147

[56] References Cited
UNITED STATES PATENTS
2,662,402 12/1953 Ince, Jr. et al. .............. 73/212X
3,400,583 9/1968 Newport et al. ............. 73/212X

*Primary Examiner*—Donald O. Woodiel
*Attorney*—Dugger, Peterson, Johnson & Westman ABSTRACT: A strut-mounted static pressure tube which is aerodynamically compensated to obtain desired static pressure measurements under supersonic flight conditions as well as under subsonic flight conditions. Compensation of the measured static pressure at the probe is achieved for both subsonic and supersonic operation of aircraft with one instrument.

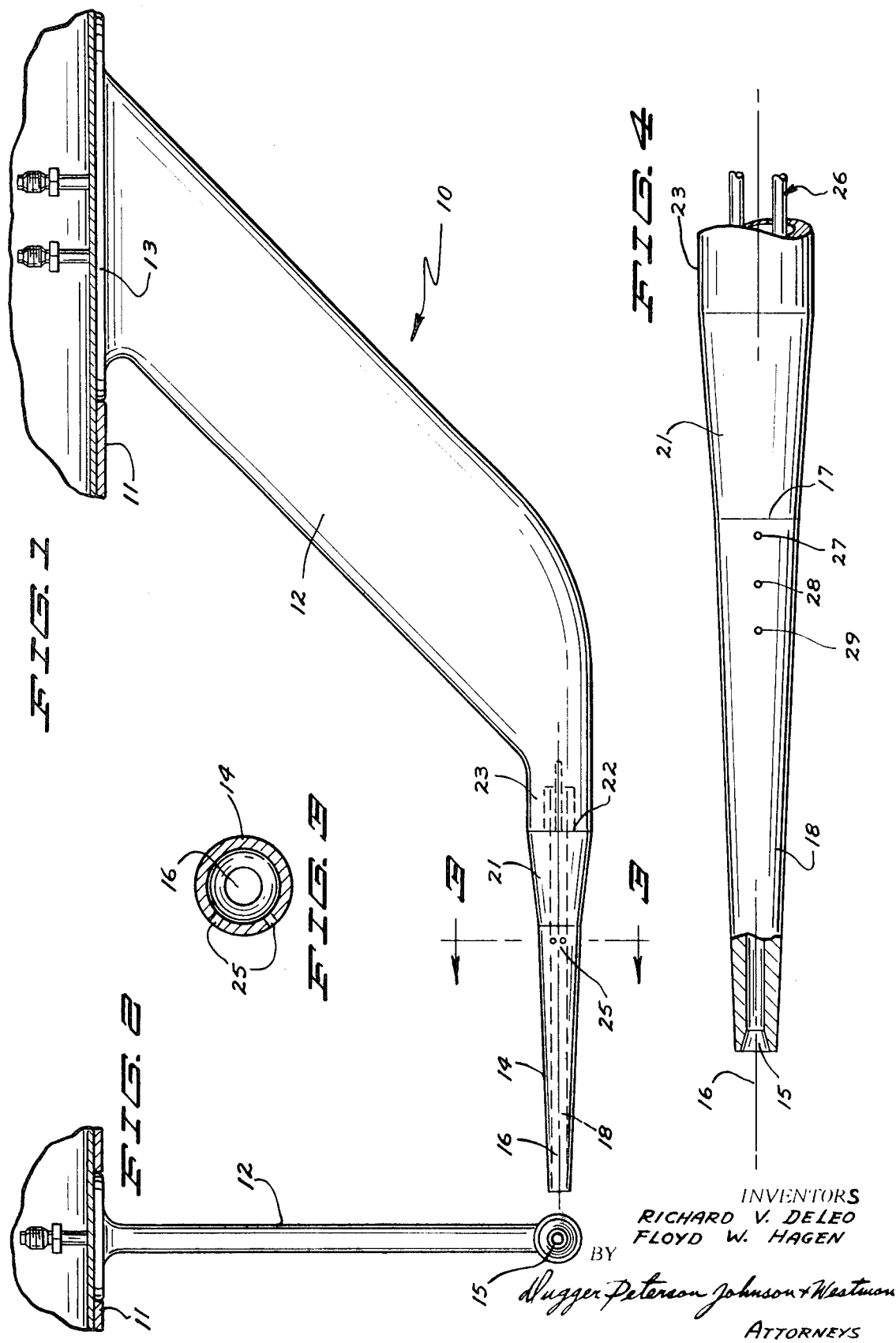

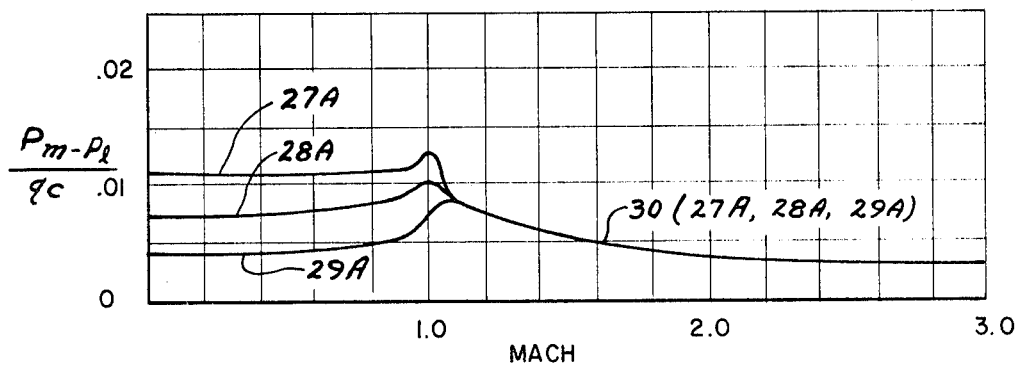
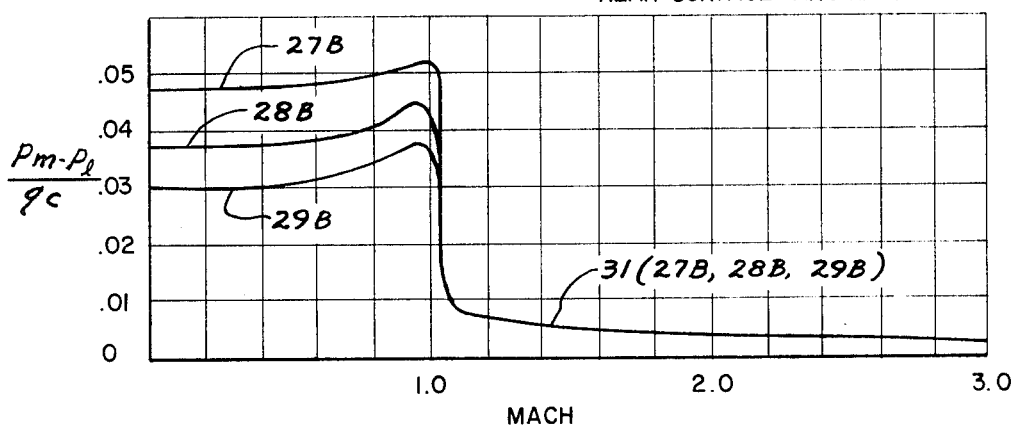
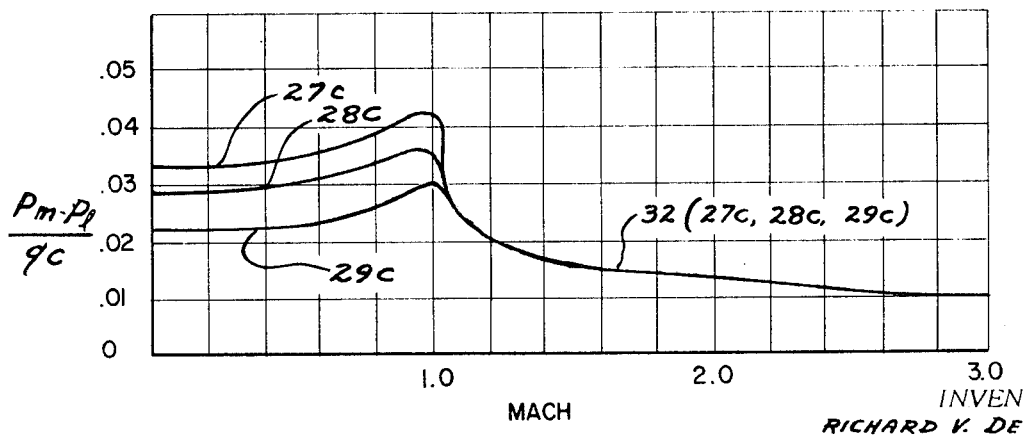

AERODYNAMICALLY COMPENSATED STATIC PRESSURE TUBE

BACKGROUND OF THE INVENTION

1. Field of the Invention

The present invention relates to static pressure-measuring tubes and more particularly to a short, strut mounted aerodynamically compensated pitot static tube which can be used for measuring static pressure and providing compensation for both subsonic and supersonic operation.

2. Prior Art

In the operation of aircraft, particularly with high-speed aircraft, it is important that the sensing probes give reliable data on static pressure. If the static pressure tube itself can have compensation features to give reliable data without the need for onboard computer functions, system reliability is greatly increased. The primary function of a compensated pitot static tube is to faithfully produce pressure signals which are modified to account for the local flow conditions or defects created by the fuselage and/or other disturbing influences such as aircraft wing surfaces. Also, in the use of air data-sensing probes, it is desirable to have short strut-mounted probes that mount onto the side surfaces of the fuselage of the aircraft to minimize weight and drag. These short strut-mounted static or pitot static tubes are rugged and resist mechanical damage and have minimal requirements for deicing power. A short probe is generally considered to be in the range of from 3 to 12 inches long extending forwardly from the strut. With a short strut-mounted probe the static pressure is influenced by the strut along its entire length at subsonic speeds. When the probes are to be used in aircraft flying at both subsonic and supersonic speeds the problems of accurate pressure sensing become more complex since at supersonic speeds the strut does not influence upstream probe pressures.

SUMMARY OF THE INVENTION

The present invention relates to a short strut-mounted pressure-sensing probe designed to provide flow induced static pressure compensation so that the measured static pressure will always be reliable and repeatable and will closely correspond to the undisturbed static pressure at different speeds of fluid flow past the probe. The present invention includes a probe barrel mounted onto a strut wherein the probe barrel has two different surface sections. A first barrel section is of a very gentle incline with respect to the probe axis and extends rearwardly from adjacent the forward tip of the barrel to a juncture wherein a second barrel surface of a greater angle with respect to the barrel axis is provided. The relation of measured static pressure to the local static pressure can be determined in wind tunnel tests. The static pressure-sensing ports are located on the barrel where a desired relationship between measured static pressure and local static pressure exists. For a measuring probe mounted on an aircraft the local static pressure includes pressure disturbances caused by the presence of the aircraft itself with respect to the flow field. Usually the compensation desired is such to provide a measured pressure closely corresponding to the static pressure which would be measured at a location outside of any disturbing influences of the aircraft. The forward surface of the probe provides for a static pressure compensation useful at supersonic speeds, while the second surface, which is of larger angle with respect to the probe axis, provides for compensation at subsonic speeds.

BRIEF DESCRIPTION OF THE DRAWINGS

FIG. 1 is a plan view of a strut-mounted probe made according to the present invention;

FIG. 2 is a front view of the device of FIG. 1;

FIG. 3 is a sectional view taken as on line 3-3 in FIG. 1;

FIG. 4 is a fragmentary enlarged plan view of the barrel section of the sensor of FIG. 1, and FIGS. 5, 6 and 7 are graphs showing the effect on measured static pressure with different sensing port locations, and different surface angles.

DESCRIPTION OF THE PREFERRED EMBODIMENT

A short strut-mounted air data-sensing probe indicated generally at 10 is mounted onto the exterior skin or surface 11 of an aircraft in the usual manner, protruding from the side of the aircraft. The probe has a strut 12 that is mounted with a base plate 13 onto the skin 11 of the aircraft and extends laterally outwardly therefrom. The strut is streamlined in cross section and extends forwardly or upstream as well as outwardly when related to the direction of relative fluid flow. The strut 12 mounts a probe barrel member 14 and the probe barrel also has an outer end that faces upstream in the direction of relative fluid flow. When the aircraft is flying, fluid will flow past the probe, and air data measurements can be taken from the probe. When the probe is a combination pitot-static tube, the forward end has a pitot port 15 that faces generally upstream. This port is connected through suitable chambers and pressure lines to instruments for recording the pitot pressure.

The pitot tube from port 15, of course, is sealed from the static pressure chamber of the probe. The use of the pitot opening 15 does also affect pressure distribution and it can be seen that the present device is operative even with the pitot port in use.

The probe barrel has a longitudinal axis 16 which is the centerline axis of the barrel. As shown, the probe is conical from the upstream or outer end thereof rearwardly toward a junction or surface intersection line 17 and has a first forward outer frustoconical surface 18. As shown, the frustoconical surface 18 is substantially 2° to 4° with respect to the axis 16 of the barrel back to the junction line 17. This conical surface from the leading end gets larger rearwardly and the angle can preferably range between 1° and 6° with respect to the axis. Then, there is a second frustoconical surface 21 extending from junction line 17 to the base line 22 at which point the outer surface of the barrel becomes a cylindrical surface 23. The second frustoconical surface 21 is at a larger angle with respect to axis 16 than the first frustoconical surface. As shown, the angle of surface 21 can range between 3° to 8° and should be 1° to 6° greater than the angle of the first surface. Thus, the first surface 18 forms a first barrel section and the second surface 21 forms a second barrel section, both of which increase in size rearwardly with respect to the longitudinal axis 16 of the barrel, but at different angles. Stated another way, the surfaces 18 and 21 diverge from the axis 16 in rearwardly direction. The surfaces 18 and 21 do not have to be frustoconical but can have different cross cross section, other than circular.

The probe barrel 14 is provided with static pressure sensing ports shown generally in FIG. 1 at 25 which comprise small passageways that open through the wall of the probe into an interior opening or chamber, and which are connected through suitable tubing or lines illustrated generally at 26 to suitable instruments. The ports 25 are positioned so that their center axis is spaced from the junction line 17 between the two frustoconical barrel surfaces 18 and 21.

In FIG. 4, the ports are separately numbered for illustrative purposes to show the effect of location of the ports on the measured static pressure, and these ports are related to FIGS. 5, 6 and 7.

Referring now to FIG. 5, a graph showing a normalized pressure function $P_m - P_1/q_c$ as hereinafter defined plotted versus Mach number is shown. The effect of varying the longitudinal location of the static pressure sensing port is shown. In obtaining this data the front surface 18 had an angle of 2° with an angle of 3° on the second surface 21. When the sensing port is positioned at location of port 27 in FIG. 5, the subsonic (below Mach 1) pressure error correction is indicated by the curve 27A. When the sensing port was positioned further ahead of the junction line 17, for example at position of port 28, the pressure error compensated curve at subsonic speeds is shown as curve 28A. When the static pressure-sensing port is positioned at location of port 29 in FIG. 4, which is still farther forwardly of the junction line 17 than the other two ports of FIG. 4, the normalized static pressure error curve is shown at 29A in FIG. 5. Thus, until the relative speed of fluid flow reaches Mach 1, the pressure curves are different for these barrel locations. Above Mach 1, the relative positioning of the static pressure-sensing ports is not significant, and the curves merge together after the transition zone just above and below Mach 1. Then, the longitudinal positioning of the sensing port on the barrel is not of a significant nature as long as it is ahead of the junction line 17 and adjacent the line 17. The second surface 21 provides a positive rise in measured static pressure ahead of the junction line 17 which is particularly important at subsonic speeds. The ports should be located somewhere on the probe where the measured static pressure is in the area of measured static pressure rise caused by the second surface 21. For each of the curves, only one of the ports 27, 28 and 29 were open at a time. Thus data was collected independently for each curve. This is true for FIGS. 6 and 7 as well.

The forward barrel surface 18 provides the compensation at supersonic speeds, while at subsonic speeds the surface 21, which is of the larger angle, provides a static pressure rise along the probe barrel so that the measured pressure is further compensated.

In the curve of FIG. 5, the vertical axis is used as a pressure error function which has been normalized. This function is expressed as $P_m - P_1/q_c$ where $P_m$ is equal to the measured static pressure, $P_1$ is the local static pressure (the actual static pressure at the mounting location on the aircraft excluding the influence of the strut or the probe) and $q_c$ is the total pressure minus the local static pressure. This function is a normalized (dimensionless) pressure function widely used in the aircraft industry. This normalized function indicates that there is a positive measured static pressure compensation along the probe.

The effect of changing the angle of the second frustoconical surface 21 is shown in FIG. 6. The angle of the front barrel surface 18 remains at 2°, and the angle of the rear surface 21 is 6° for the curves shown in FIG. 6. Curve 27B is for the static pressure port 27, 28B is for the static pressure port 28, and 29B is for the static pressure port 29. Here the numerical value of compensation is greater, or in other words is more positive below Mach 1 at these port locations because of the greater angle of the frustoconical surface 21. However, after the speed of sound has been exceeded, the static pressure error curve drops down to become that of the curve shown in FIG. 5. This supersonic curve is shown at 30 in FIG. 5 and at 31 in FIG. 6. The curves shown that the forward barrel angle of 2° results in a repeatable static pressure compensation of a positive and predictable nature across the range of speed from Mach 1 to Mach 3.

Thus, the second frustoconical barrel portion 21 provides the primary compensation at subsonic speeds, and this compensation can be changed by changing the angle of the surface, as well as changing the position of the static pressure ports with respect to the start of the surface. The location of the static pressure-sensing ports on the first barrel portion (the surface 18) insures that the static pressure-sensing compensation will be accurate at supersonic speeds. The positioning of these ports with respect to the junction 17 of the first and second conical surface, and the angle of the second surface determines the actual amount of compensation as well.

FIG. 7 is a graphical representation of the normalized pressure function $P_m - P_1/q_c$ plotted versus Mach number with a 4° angle of frustoconical surface 18 with respect to the axis of the barrel. The second surface 21 has an angle of 6°, which is 2° greater than the front surface.

Curves 27C, 28C and 29C are from data taken at the ports 27, 28 and 29 respectively as before.

It can be noted that again at supersonic speeds the curves merge together as shown at 32, but here the normalized pressure function is more positive at supersonic speeds than with a 2° taper on surface 18. With subsonic speeds, with the 6° angle on the rear surface and a 4° angle on surface 18 the curves show lower values of compensation than with a 6° taper on surface 21 and a 2° taper on surface 18.

The forward cone portion gives a compensating effect at supersonic speeds. In flight conditions the forward frustoconical surface contributes a slight negative correction to the pressure measurement at subsonic flow conditions and a slight positive correction under supersonic flow conditions. Under subsonic conditions the major effect felt by the static pressure ports is due to the rear surface which has a greater cone angle. This rear surface has no effect on the static ports under supersonic conditions so that the only correction then is due to the forward surface. This design then allows one to design the probe for a given compensation curve subsonically and a different compensation curve supersonically through choice of angle for surfaces 18 and 21 with respect to the axis of the barrel. A change in the forward cone angle will affect both subsonic and supersonic compensations as shown in FIG. 7. However, a change in the rearward cone angle will significantly affect only the subsonic compensation value, as shown in FIGS. 5 and 6.

The actual difference between measured static pressure and true or local static pressure at the port locations 27, 28 and 29 is not large at subsonic ranges. The normalized factor is dependent upon the value of $q_c$ (which is impact pressure or pitot pressure minus static pressure). At subsonic ranges $q_c$ is quite small. At supersonic ranges $q_c$ becomes large. This means that on the graph of FIGS. 5, 6 and 7 a distance of 0.01 on the vertical scale at Mach 2.5 would perhaps mean an actual difference between the measured static pressure and local static pressure 40 times as great as the same vertical differences on the chart at Mach 0.5. Therefore, dual pressure-measuring system using ports 27 and 29 would be satisfactory for operation at both subsonic and supersonic speeds. A dual system means that there are two pressure-measuring systems completely separated to give dual reading. Subsonically, the second surface 21 of the barrel provides a positive static pressure compensation upstream from this surface and also for a short distance to the rear of line 17. Supersonically the surface 21 provides a positive pressure compensation throughout its length proportional to the angle of said surface. If desired, one port location for a dual system could be along surface 21 in order to obtain a desired compensation as described more fully in our U.S. Pat. No. 3,482,445, issued Dec. 9, 1969 for Strut Mounted Dual Static Tube.

It should be noted that if dual systems are required the ports used would be separated from each other by interior bulkheads inside the barrel and sealed tubes leading from the separate chambers. In other words, the pressures would be kept separate. Thus the pressure port 27 would be used for one system and pressure port 28 or 29 would be used for a completely separated system.

In actual installation there is more than one port on a radial plane passing through the probe. Two ports are shown in FIGS. 1 and 3, although there frequently are more than two. These ports are usually radially spaced-apart but with their central axes on the same cross-sectional plane to provide some averaging of pressures between two ports. This gives a reliable reading across a wider operating range of angles of attack and sideslip of the aircraft.

In supersonic aircraft where the primary operation is at supersonic speeds using a short probe with a single frustoconical surface extending from adjacent the leading end of the barrel all the way to the strut has been found to provide satisfactory static pressure compensation for some installations. When the sensing ports are upstream from a surface irregularity such as the second frustoconical surface 21 or the strut, such surface irregularities do not affect the measured static pressure at supersonic speeds. These rearward enlarging irregularities do affect the measured pressure at subsonic speeds by causing a pressure rise ahead of the irregularity.

The strut itself is also a surface irregularity which will give a static pressure rise ahead of (upstream of) the strut. The strut increases the effective size of the probe barrel downstream from the sensing port and can directly join the front frustoconical surface, just as the rear surface 21 as shown joins the front surface 18. There also may be fillet surfaces between the probe barrel and the strut. These fillets or radiused surfaces can also be considered as surface irregularities that will give positive compensation for subsonic speeds.

If a single frustoconical surface such as surface 18 extends all the way back to the strut or fillet surfaces joining the barrel and strut, and the sensing ports are ahead of the strut, the probe will be satisfactory for some applications. The strut or fillet surfaces provide a desired pressure field for subsonic operation and the frustoconical surface as previously explained gives the compensation desired at supersonic speeds.

We claim:

1. In a pressure-sensing probe, a barrel having first and second ends, strut means at the second end of said barrel to position said barrel spaced from a mounting surface and in position to be impinged by fluid flow, said barrel having a longitudinal axis positioned substantially parallel with respect to normal fluid flow, said barrel having a first outer surface substantially continuously diverging from said longitudinal axis in downstream direction from adjacent the first end of said barrel, and having a second outer surface merged into and joining said first surface and extending downstream therefrom and diverging from the first surface in downstream direction at a greater included angle with respect to said longitudinal axis than said first outer surface, and static pressure-sensing port means opening through said barrel at a preselected position on said first outer surface.

2. The combination as specified in claim 1 wherein said first and second surfaces are frustoconical surfaces.

3. The combination as specified in claim 2 wherein said second surface forms an angle between 1° and 6° greater with respect to the longitudinal axis of said barrel than the angle formed with said axis by said first surface.

4. In a static pressure-sensing probe, a short barrel having a longitudinal axis with a first end thereof facing upstream, a support strut attached to said barrel at a second end thereof, said barrel having a first outer surface substantially continuously increasing in cross-sectional size in downstream direction from adjacent the first end of said barrel, and a second outer surface joining said first surface and extending downstream from the first outer surface and increasing in cross-sectional size at a greater included angle with respect to said longitudinal axis of said barrel than said first outer surface, and static pressure port means opening through said barrel in the region of said outer surfaces.

5. The device of claim 4 wherein at least one of said static pressure-sensing ports opens through said first surface.

6. The combination as specified in claim 4 wherein first and second outer surfaces are frustoconical.

7. The combination as specified in claim 4 wherein said first outer surface forms an angle of substantially 2° to 4° with respect to the longitudinal axis of said barrel.

8. The combination as specified in claim 6 wherein said second outer surface forms an angle with the longitudinal axis of the barrel between 1° and 6° greater than the angle formed by said first outer surface with respect to said longitudinal axis.

9. The combination as specified in claim 8 wherein at least one of said static pressure-sensing port means is located upstream from the junction between said first and second outer surfaces.

10. The combination as specified in claim 4 wherein there are two static port means axially displaced along said barrel and said static port means are separately connected to instrumentation to provide dual pressure sensing, said port means being positioned in areas where the pressure sensed at each port means is at a desired relationship to the pressure at the other port means.

11. In a pressure-sensing probe, a barrel having first and second ends, strut means at the second end of said barrel to positioned said barrel spaced from a mounting surface and in position to be impinged by fluid flow, said barrel having a longitudinal axis positioned substantially parallel with respect to normal fluid flow, said barrel having a substantially frustoconical outer surface substantially continuously diverging from said longitudinal axis in downstream direction from adjacent the first end of said barrel, said probe including a surface irregularity at the downstream terminus of said outer surface which increases the effective size of the probe downstream from the frustoconical outer surface and joined at said frustoconical surface, and static pressure-sensing port means opening through said barrel at a preselected position adjacent said surface irregularity wherein the static pressure is materially influenced by said irregularity at subsonic speed and is influenced by said outer surface at supersonic speed.

12. The combination as specified in claim 11 wherein said first surface forms an angle between 1° and 6° with respect to the longitudinal axis of said barrel.

13. The pressure-sensing probe of claim 1 wherein said barrel ranges in length between 3 and 12 inches.

14. The pressure-sensing probe of claim 11 wherein said static pressure port means open through said outer surface.

15. The static pressure-sensing probe of claim 11 wherein said strut means extends asymmetrically from said barrel adjacent one end thereof.

16. The pressure-sensing probe of claim 11 wherein said barrel is short, and ranges in length between 3 and 12 inches.